(12) United States Patent
Stojancic et al.

(10) Patent No.: US 8,208,553 B2
(45) Date of Patent: Jun. 26, 2012

(54) METHODS AND APPARATUS FOR QUARTER-PEL REFINEMENT IN A SIMD ARRAY PROCESSOR

(75) Inventors: Mihailo M. Stojancic, Berkeley, CA (US); Gerald George Pechanek, Cary, NC (US)

(73) Assignee: Altera Corporation, San Jose, CA (US)

( * ) Notice: Subject to any disclaimer, the term of this patent is extended or adjusted under 35 U.S.C. 154(b) by 1427 days.

(21) Appl. No.: 11/736,849

(22) Filed: Apr. 18, 2007

(65) Prior Publication Data
US 2008/0037647 A1 Feb. 14, 2008

Related U.S. Application Data

(60) Provisional application No. 60/797,558, filed on May 4, 2006.

(51) Int. Cl.
*H04N 7/26* (2006.01)
(52) U.S. Cl. .............. 375/240.17; 375/240; 375/240.01; 375/240.12; 375/240.16
(58) Field of Classification Search ............ 375/240.17, 375/240, 240.01, 240.12, 240.16
See application file for complete search history.

(56) References Cited

U.S. PATENT DOCUMENTS

| | | | |
|---|---|---|---|
| 6,622,234 B1* | 9/2003 | Pechanek et al. ............... 712/22 |
| 7,257,696 B2 | 8/2007 | Pechanek et al. | |
| 7,505,636 B2* | 3/2009 | MacInnis et al. ............. 382/300 |
| 2001/0028682 A1* | 10/2001 | Nakaya et al. ........... 375/240.16 |
| 2001/0028745 A1* | 10/2001 | Nakaya ......................... 382/236 |
| 2001/0031090 A1* | 10/2001 | Nakaya et al. ................ 382/236 |
| 2001/0046264 A1* | 11/2001 | Fandrianto et al. ...... 375/240.16 |
| 2001/0050957 A1* | 12/2001 | Nakaya et al. ........... 375/240.17 |
| 2001/0053186 A1* | 12/2001 | Nakaya .................... 375/240.25 |
| 2002/0034254 A1* | 3/2002 | Yamada .................... 375/240.25 |
| 2002/0037045 A1* | 3/2002 | Yamada ...................... 375/240.2 |
| 2002/0114394 A1* | 8/2002 | Ma .......................... 375/240.16 |
| 2002/0171759 A1* | 11/2002 | Handjojo et al. ............. 348/452 |
| 2003/0112864 A1* | 6/2003 | Karczewicz et al. .... 375/240.01 |
| 2003/0158877 A1* | 8/2003 | Chatterjee ..................... 708/300 |
| 2003/0169931 A1* | 9/2003 | Lainema ....................... 382/236 |
| 2003/0194009 A1* | 10/2003 | Srinivasan ............... 375/240.16 |
| 2003/0194010 A1* | 10/2003 | Mukerjee et al. ........ 375/240.16 |
| 2003/0194011 A1* | 10/2003 | Srinivasan ............... 375/240.17 |
| 2003/0198293 A1* | 10/2003 | Chen et al. ............... 375/240.16 |
| 2003/0202607 A1* | 10/2003 | Srinivasan ............... 375/240.29 |
| 2004/0052420 A1* | 3/2004 | Nakaya ......................... 382/238 |
| 2004/0101059 A1* | 5/2004 | Joch et al. ................. 375/240.29 |
| 2004/0120401 A1* | 6/2004 | Linzer et al. ............. 375/240.16 |
| 2004/0125875 A1* | 7/2004 | Nakaya .................... 375/240.12 |

(Continued)

*Primary Examiner* — Yin-Chen Shaw
*Assistant Examiner* — Bradley Holder
(74) *Attorney, Agent, or Firm* — Law Offices of Peter H. Priest, PLLC

(57) ABSTRACT

An apparatus and a method for quarter-pel motion compensated search are described in the context of an array processor with tightly coupled, multi-cycle hardware assist attached to each node. A quarter-pel motion compensated search (QP-MCS) instruction initiates the quarter-pel motion compensated search pipeline operation. An instruction decode and instruction operation control unit generates a starting address for a 4×4 block of a current macro block search operation indicating where to fetch the pel values. An interpolation unit determines at least eight neighboring quarter-pels per pipeline stage based on the 4×4 block of pel values. An absolute value of difference function computes the absolute value of difference values between a current macro block pel and the at least eight neighboring quarter-pels per pipeline stage. An accumulator accumulates at least eight summation values for the 4×4 block at quarter-pel positions per pipeline stage.

16 Claims, 5 Drawing Sheets

U.S. PATENT DOCUMENTS

| | | | |
|---|---|---|---|
| 2004/0126023 A1* | 7/2004 | Nakaya | 382/238 |
| 2004/0126024 A1* | 7/2004 | Nakaya | 382/238 |
| 2004/0126025 A1* | 7/2004 | Nakaya | 382/238 |
| 2004/0136461 A1* | 7/2004 | Kondo et al. | 375/240.16 |
| 2004/0146109 A1* | 7/2004 | Kondo et al. | 375/240.16 |
| 2004/0207725 A1* | 10/2004 | Fandrianto et al. | 348/14.13 |
| 2005/0002576 A1* | 1/2005 | Nakaya | 382/233 |
| 2005/0002577 A1* | 1/2005 | Nakaya | 382/233 |
| 2005/0002581 A1* | 1/2005 | Nakaya | 382/238 |
| 2005/0008237 A1* | 1/2005 | Nakaya | 382/233 |
| 2005/0013367 A1* | 1/2005 | Gallant et al. | 375/240.16 |
| 2005/0013372 A1* | 1/2005 | Srinivasan | 375/240.16 |
| 2005/0013499 A1* | 1/2005 | Nakaya | 382/239 |
| 2005/0036700 A1* | 2/2005 | Nakaya | 382/239 |
| 2005/0196073 A1* | 9/2005 | MacInnis et al. | 382/300 |
| 2006/0088104 A1* | 4/2006 | Molloy et al. | 375/240.17 |
| 2006/0133506 A1* | 6/2006 | Dang | 375/240.17 |
| 2008/0133892 A1 | 6/2008 | Pechanek et al. | |

* cited by examiner

Search Window (SW)   ○ SW 1/2 pixel Position
× SW & Current MB Full Pixel Position   ● SW 1/4 Pixel Position

METHODS AND APPARATUS FOR QUARTER-PEL REFINEMENT IN A SIMD ARRAY PROCESSOR

RELATED U.S. APPLICATION DATA

The present application claims the benefit of U.S. Provisional Application No. 60/797,558, filed May 4, 2006, which is incorporated by reference herein in its entirety.

FIELD OF THE INVENTION

The present invention relates generally to improvements in parallel data processing architectures for video processing and more particularly to apparatus and methods for quarter pixel (quarter-pel) refinement in a single instruction multiple data (SIMD) array processor.

BACKGROUND OF THE INVENTION

Increasing demand for high definition TV products, including interactive TV in a HD format and HD video compression encoding and decoding, requires increasing sophistication, flexibility, and performance in the supporting electronics. The sophistication, flexibility, and performance requirements for HD digital video processing, exceeds the capabilities of current generations of processor architectures by, in many cases, orders of magnitude.

The demands of video encoding for HD formats are both memory and data processing intensive, requiring efficient and high bandwidth memory organizations coupled with compute intensive capabilities. In addition, a video encoding product must be capable of supporting multiple standards each of which includes multiple optional features which can be supported to improve image quality and further reductions in compression bandwidth. Due to these multiple demands, a flexible parallel processing approach must be found to meet the demands in a cost effective manner.

A number of algorithmic capabilities are generally common between multiple video encoding standards, such as MPEG-2, H.264, and SMPTE-VC-1. Motion estimation/compensation and deblocking filtering are two examples of general algorithms that are required for video encoding. To efficiently support motion estimation algorithms and other complex programmable functions which may vary in requirements across the multiple standards, a processor by itself would require significant parallelism and very high clock rates to meet the requirements. A processor of this capability would be difficult to develop in a cost effective manner for commercial products.

A digital video sequence consists of a series of pictures (combined luminance and chrominance samples) arranged in a temporal succession. It may contain either progressive or interlaced frames, which may be mixed together within the same video stream.

Motion estimation/compensation methods used by video coding algorithms exploit this temporal picture structure by reducing the redundancy inherent in the video sequences of this type. They represent a central part of the video encoding process of MPEG-4 AVC H.264 and SMPTE-VC-1 video encoding standards.

Motion estimation is computationally the most expensive part of a video encoding process. On average it takes about 60-80% of the total available computational time, thus having the highest impact on the speed of the overall encoding process. It also has a major impact on the visual quality of encoded video sequences.

The most common motion estimation algorithms are block matching algorithms operating in the time domain. Here motion vectors are used to describe the best temporal prediction for a current block of pixels to be encoded. A time domain prediction error between the current block of pixels and the reference block of pixels is formed, and a search is performed to minimize this value. In general, motion search is divided up into a first full pixel search, followed by a half pixel refined search which is followed by a quarter pixel search.

The motion search process is computationally intensive and represents a bottleneck in efficient real-time execution of video encoding at high definition formats.

It will be highly advantageous to efficiently address such problems as the quarter pixel search process discussed in greater detail below.

SUMMARY OF THE INVENTION

In one or more of its several aspects, the present invention addresses problems such as those described above. In one of its aspects, the present invention describes an apparatus that allows improvements in processor node capability in a SIMD array processor.

An embodiment of the present invention addresses a method for quarter-pel motion compensated search. Issuing a quarter-pel motion compensated search (QPMCS) instruction to initiate the quarter-pel motion compensated search pipeline operation. Interpolating a 4×4 block of current macro block pel positions to produce at least eight neighboring quarter-pels per pipeline stage. Computing at least eight absolute value of difference values between a current macro block pel and the at least eight neighboring quarter-pels per pipeline stage. Accumulating at least eight summation values for the 4×4 block at quarter-pel positions per pipeline stage.

In another embodiment, the present invention addresses an apparatus for quarter-pel motion compensated search. An instruction decode and instruction operation control unit generates a starting address for a 4×4 block of a current macro block search operation indicating where to fetch the pel values. An interpolation unit determines at least eight neighboring quarter-pels per pipeline stage based on the 4×4 block of pel values. An absolute value of difference function computes the absolute value of difference values between a current macro block pel and the at least eight neighboring quarter-pels per pipeline stage. An accumulator accumulates at least eight summation values for the 4×4 block at quarter-pel positions per pipeline stage.

These and other features, aspects, techniques and advantages of the present invention will be apparent to those skilled in the art from the following detailed description, taken together with the accompanying drawings and claims.

DETAILED DESCRIPTION

The present invention will now be described more fully with reference to the accompanying drawings, in which several embodiments of the invention are shown. This invention may, however, be embodied in various forms and should not be construed as being limited to the embodiments set forth herein. Rather, these embodiments are provided so that this disclosure will be thorough and complete, and will fully convey the scope of the invention to those skilled in the art.

Further details of attaching an application specific hardware assist function within an array processor for use in conjunction with the present invention is found in U.S. Provisional Application Ser. No. 60/795,140 entitled "Methods and Apparatus for Attaching Application Specific Functions Within an Array Processor" filed Apr. 26, 2006 and incorporated by reference herein in its entirety.

Figure 1:
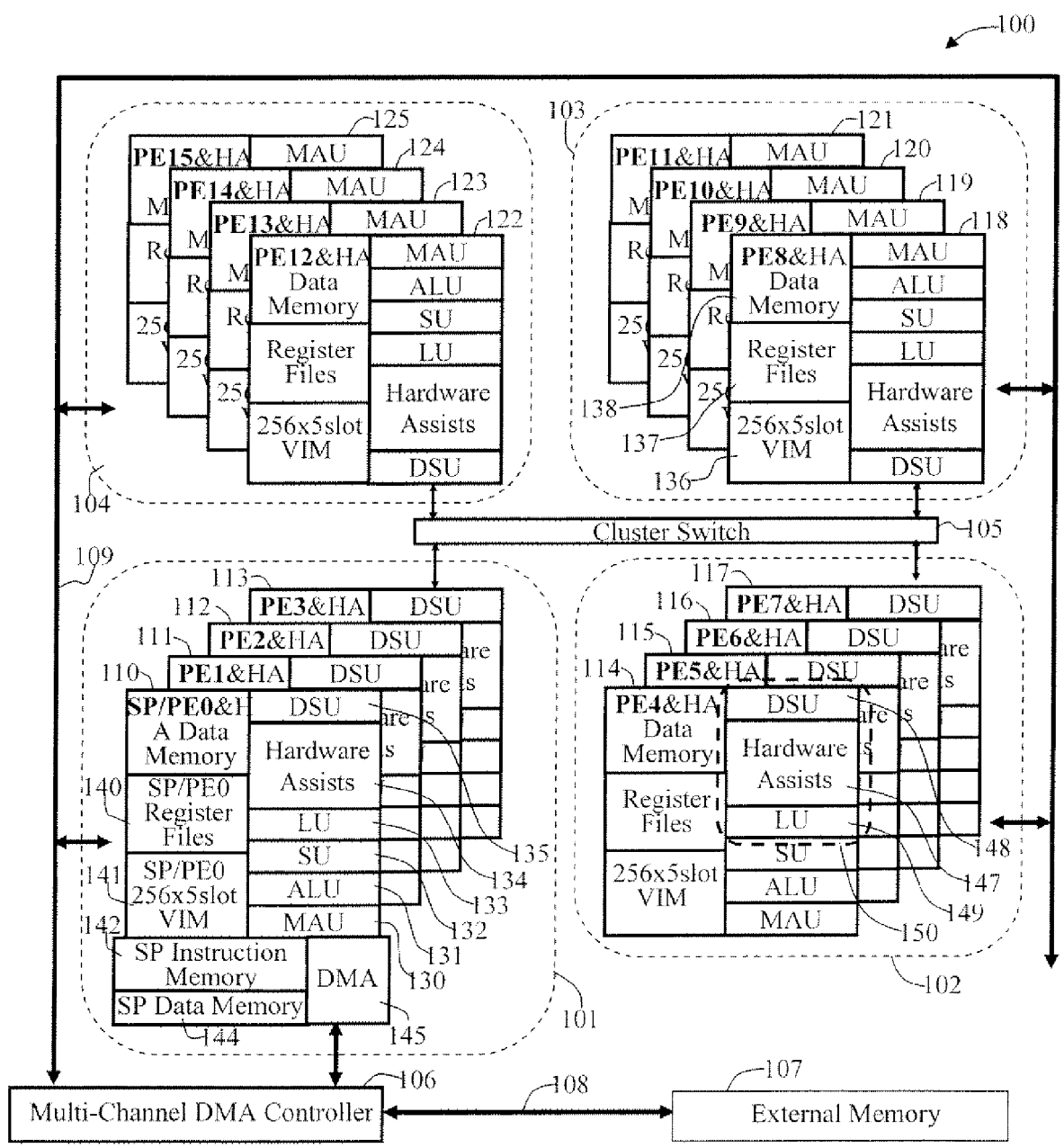
FIG. 1 illustrates a sixteen node video signal processor ($VSP_{16}$) in accordance with one or more embodiments of the present invention.

FIG. 1 illustrates a sixteen-node video signal processor ($VSP_{16}$) 100 in accordance with one or more embodiments of the present invention. The $VSP_{16}$ 100 contains four transform engine (TE) clusters 101-104, an interconnection network cluster switch 105, a multi-channel direct memory access (DMA) controller 106, and an external memory 107. The DMA controller 106 interfaces with the external memory 107 over an external memory bus 108 to transfer data to and from the external memory to each of the TE clusters over a multichannel DMA bus 109.

Sixteen processor engines (PEs) 110-125 are partitioned in groups of four PEs per cluster as a 4×4 array organization. Each PE provides programmable processing and hardware assist functions. SP/PE0 110 is unique as compared to the other fifteen PEs 111-125, having an array controlling function combined with the PE function of PE0. The common features of the sixteen PEs 110-125 include a set of instruction, execution units including a multiply accumulate unit (MAU) 130, an arithmetic logic unit (ALU) 131, a store unit (SU) 132, a load unit (LU) 133, a hardware assist (HA) 134, a data select unit (DSU) 135, a 256×5 slot very long instruction word memory (VIM) 136, a local PE register file 137, and a data memory 138 local to each PE and HA. Each PE also contains local pipeline controls, decode logic, and control logic appropriate for each PE. All $VSP_{16}$ instructions are executed in a simple pipeline with a majority of instructions requiring a single execution stage and a few instructions requiring two execution stages that are pipelined.

The unique SP/PE0 110 combines a controlling function sequence processor (SP) combined with PE0 functions. To support the SP and PE0, a separate SP register file and a separate PE0 register file, illustrated in one block as SP/PE0 register files 140 are used to maintain the processing context of the SP and PE0. Though not limited to this, the SP/PE0 shares a single VIM 141. To control the $VSP_{16}$ the SP has a single thread of control supported by an SP instruction memory 142 and an SP data memory 144. The SP provides program control, contains instruction and data address generation units, supports interrupts, provides DMA control, and dispatches instructions to the PEs 110-125. The SP executes branches and controls the fetching and issuing of instructions such as load VLIW and execute VLIW instructions. The load VLIW instruction provides an indirect VIM address and is used to load the instruction slots at the specified VIM address. The execute VLIW instruction causes a VLIW to be selected at a specified indirect VIM address and executed.

The single SP thread of control supports 4×4 sub-threads which operate synchronously in lock step single instruction multiple data (SIMD) fashion. Each sub-thread uses very long instruction words (VLIWs) which are indirectly selected and executed by the single SP thread. Each VLIW in each PE at the same VIM address may be different but all unmasked PEs access the same VIM address when executing a VLIW. Five 32-bit instruction slots are provided in each PE, such that with 16 PEs 80 32-bit instructions can execute simultaneously. In addition single, dual, quad, and octal packed data operations may be specified independently by each slot instruction thereby supporting up to 8*80=640 instruction specified operations per cycle. As an example of the processing power this provides, a $VSP_{16}$ operating at 250 Mhz may achieve 640*250 Mhz=160 Giga operations per second.

The $VSP_{16}$ processor also uses an interconnection network, cluster switch 105 providing single cycle data transfers between PEs within clusters and between PEs in orthogonal clusters. The communication operations are controlled by a DSU instruction which can be included in a VLIW thereby overlapping communications with computations which with proper software pipelining the communication latency can be reduced to zero. The communication operations operate independently of the DMA which may operate in the background to stream data between the local PE memories and the external memories.

To support additional processing capability for application specific functions such as motion estimation/compensation and other high compute functions, a hardware assist (HA) unit with advantageous independent connections to local PE memory is provided. A HA unit has one or more multi-cycle tightly coupled state machine functions which provide memory intensive application, specific operational capability to each of the PEs in the $VSP_{16}$. For example, HA unit 147 interfaces with DSU 148 and LU 149 and the local data memory associated with PE4 114 as a transform engine 150.

Hardware Assist for Quarter Pixel Motion Search Refinement

In general, the motion search is performed on three different levels:

1. Full pixel search, where the comparison of the current and reference macroblocks are performed on integer pixel positions. The prediction values at integer positions are obtained by using the samples of the reference picture without alteration;

2. Half pixel refined search, where the prediction values at half pixel (sample) positions are obtained by applying a multi-lap finite impulse response (FIR) filter to produce interpolated pixels.

3. Quarter pixel search, where pixel at quarter sample positions are generated by averaging pixel, at integer and half sample positions.

After the search at full/integer pixel positions, and follow on search refinement at half pixel positions, further search refinement is often needed at quarter pixel position with reference to the full/integer pixel positions. This step requires generation of pixels at quarter-pel positions and it is the subject of this disclosure.

For each full pixel position a set of 8 new, interpolated pixels at quarter pixel position is generated and the sum of absolute difference (SAD) between the current MB pixels and pixels at quarter pixel position is computed. This is done in 8 different directions by displacing the current MB pixels by a quarter-pel distance horizontally in left and right directions, vertically in up and down direction, and 4 diagonal directions. This step allows for 8 SAD values to be computed for each block of 4×4 pixels. Next, the smallest SAD value is selected and a motion vector is generated describing the best matched quarter pixel MB position.

A hardware assist module for quarter-pel motion search refinement is an autonomous multi-cycle execution unit for computing motion compensated search refinement with quarter pixel accuracy.

Figure 2:
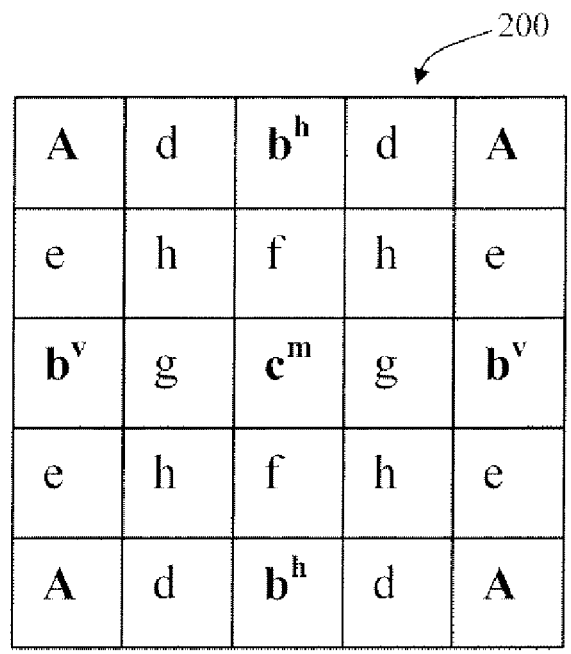
FIG. 2 illustrates a grid of integer (A) and fractional sample positions, ½ (b, c) and ¼ (d, e, f, g, h), for luminance interpolation.

FIG. 2 illustrates a grid 200 of integer (A) and fractional sample positions, ½ (b, c) and ¼ (d, e, f, g, h), for luminance interpolation. As shown in FIG. 2 pixels at half pixel positions labeled as '$b^h$' are obtained by first calculating intermediate value b applying the 6-tap filter to the nearest pixels 'A' at integer positions in horizontal direction. The final values are calculated using $b^h=((b+16)>>5)$. The pixels at half pixel positions labeled as '$b^v$' are obtained equivalently with the filter applied in vertical direction.

The pixel, at half pixel position labeled as '$c^m$' is obtained by applying the 6-tap filter to intermediate values b of the closest half pixel positions in either vertical or horizontal direction to form an intermediate result c. The final value is calculated using $c^m=((c+512)>>10)$.

The prediction values at quarter pixel positions are generated by averaging pixels at integer and half pixel positions. The process for each position is described below.

Pixels at quarter pixel positions labeled as 'd', 'g', 'e' and 'f' are obtained by averaging with truncation the two nearest pixels at integer or half pixel position using $d=(A+b^h)>>1$, $g=(b^v+c^m)>>1$, $e=(A+b^v)>>1$, $f=(b^h+c^m)>>1$.

Pixels at quarter pixel, positions labeled as 'h' are obtained by averaging with truncation the closest '$b^h$' and '$b^v$' pixels in diagonal direction using $h=(b^h+b^v)>>1$.

Chrominance Interpolation for Fractional Pixel Position

Figure 3:
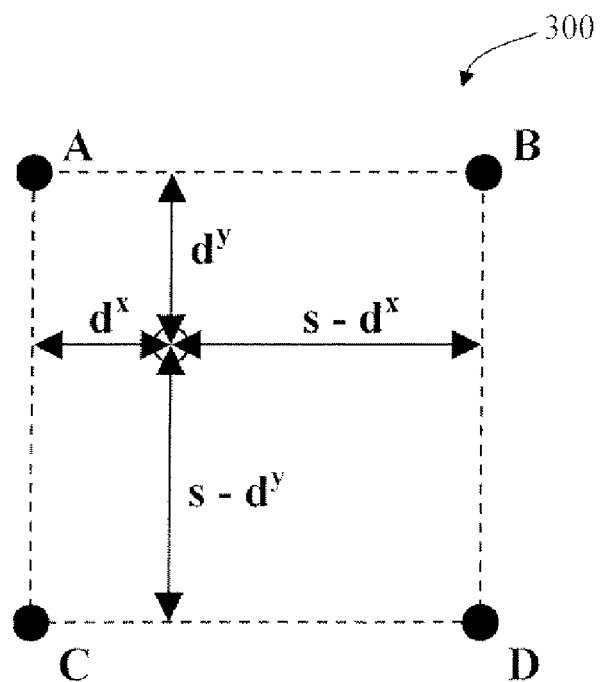
FIG. 3 illustrates a relationship matrix of fractional sample position dependent variables in chrominance interpolation and surrounding integer position samples A, B, C, and D.

FIG. 3 illustrates a relationship matrix 300 of fractional sample position dependent variables in chrominance interpolation and surrounding integer position samples A, B, C, and D. Fractional chrominance pixels are obtained by using the equation:

$$v=((s-d^x)(s-d^y)A+d^x(s-d^y)B+(s-d^x)d^yC+d^xd^yD+s^2/2)/s^2,$$

where A, B, C and D are the integer position reference picture pixels surrounding the fractional pixel location, $d^x$ and $d^y$ are the fractional parts of the pixel position in units of one eighth pixels for quarter pixel interpolation, and s is 8 for quarter pixel interpolation. Relationships between the variables in the above equation and reference picture positions are illustrated in FIG. 3.

Figure 4:
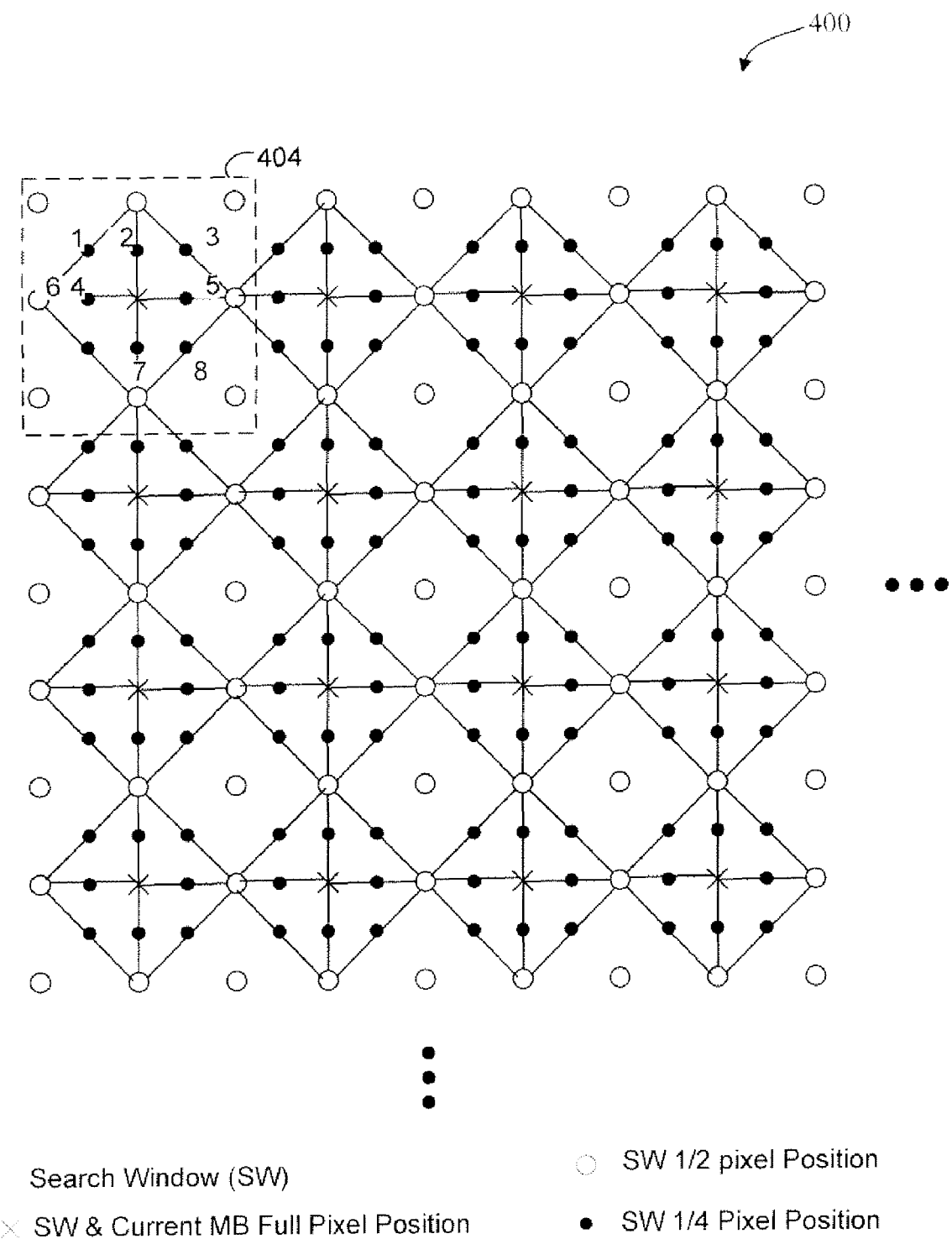
FIG. 4 illustrates a grid for a 4×4 block of the current MB pixel positions and supporting the computation of SAD values for each of the 8 quarter-pel positions and each block of 4×4 of the current MB pixels.

FIG. 4 illustrates a grid 400 for a 4×4 block of the current MB pixel positions and supporting the computation of SAD values for each of the 8 quarter-pel positions and each block of 4×4 of the current MB pixels. The grid 400 illustrates full-pel, half-pel and quarter-pel positions within the search window, with the current MB pixels placed (based on the previous search results) at the full/half-pel positions. An exemplary set of eight quarter-pel positions are numbered from 1 to 8 in the outlined box 404 of the grid 400 of FIG. 4. The quarter pixels are produced by averaging neighboring full and ½ pixels in vertical, horizontal, and diagonal directions. When the SAD values for the quarter-pel refinement are calculated, each current MB pixel is subtracted from 8 quarter-pel values in the surrounding area, and the absolute value of each difference is formed. These absolute values are used next to accumulate the sum of absolute difference (SumABSDIFF) for each of the 4×4 blocks of the current MB of 16×16 pixels, and at each of the 8 quarter-pel positions.

Figure 5:
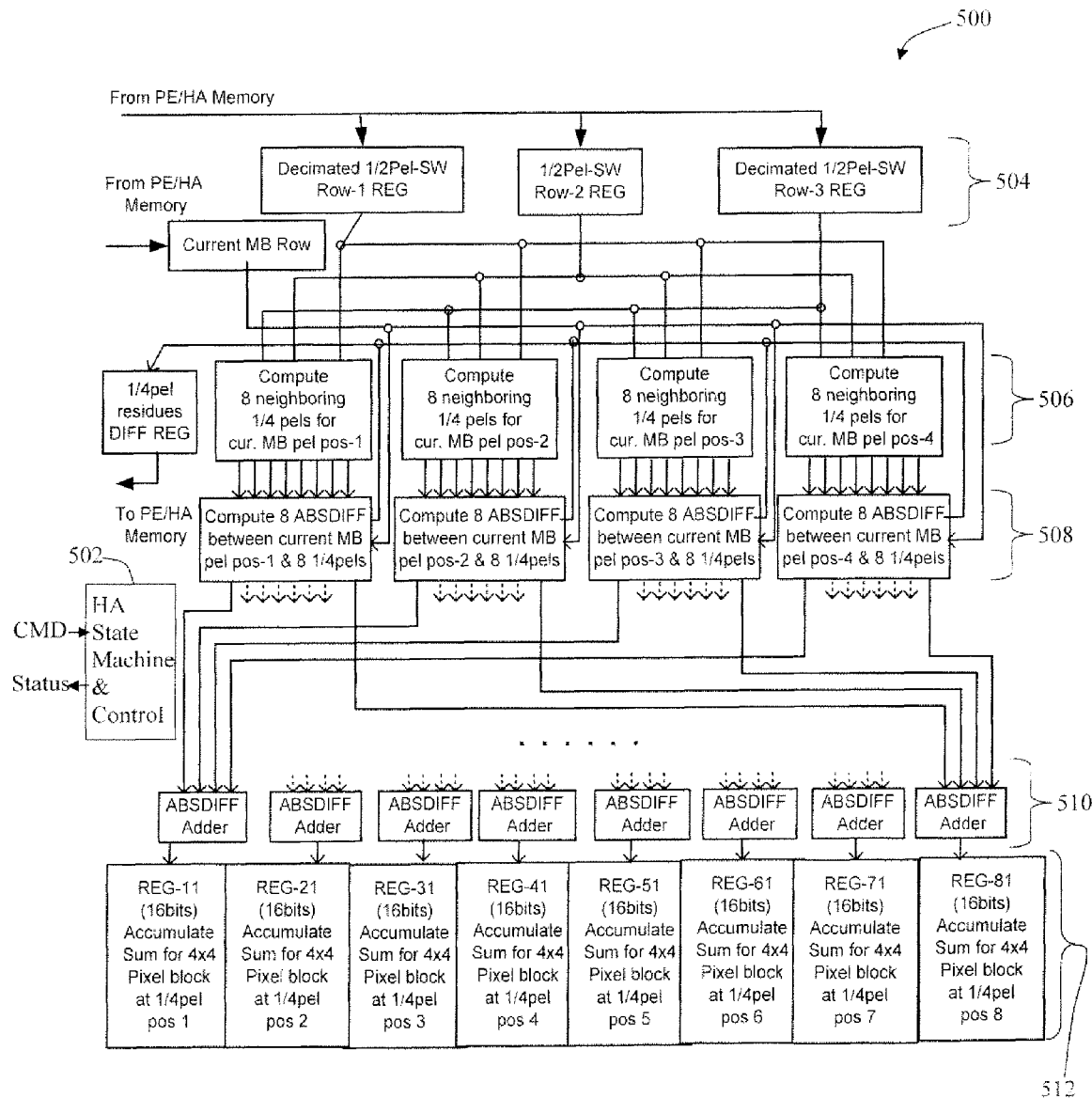
FIG. 5 illustrates a first portion of a quarter-pel motion compensated search hardware assist pipeline in accordance with the present invention.

FIG. 5 illustrates a first portion, of a quarter-pel motion compensated search hardware assist pipeline 500 in accordance with the present invention. The quarter-pel motion compensated search. (QPMS) operation is initiated by use of a QPMS instruction which may combine features of a processing element load instruction for passing commands, address generation values, and compute register file values to the quarter-pel motion compensated search hardware assist state machine and control 502. The quarter-pel motion compensated search hardware assist pipeline 500 produces in parallel 8 interpolated 1 quarter pixels for each of the 4 MB pixel positions in a MB row, and then produces 8 SADs for all 4 pixels at 8 quarter-pel positions. Each SAD is accumulated in a 16 bit register/accumulator to form a SAD for a 4×4 block of pixels in 4 passes of the inner execution loop. A quarter-pel residue (the difference between each quarter-pel value and the corresponding current MB pixel) is saved in the DIFFREG and then saved in the local PE/HA memory.

The data path in FIG. 5 consists of five stages:
1. load pixel registers 504;
2. quarter-pel simultaneous computation at 8 quarter-pel positions for 4 pixels 506;
3. 4×8 ABSDIFF formation and quarter-pel residue extraction to be stored in the local PE/HA memory 508;
4. eight simultaneous sums of ABSDIFF formation 510; and
5. eight simultaneous accumulate/store result operations 512.

The quarter-pel motion compensated search computational hardware assist pipeline 500 produces in parallel 8 interpolated quarter pixels for each of the 4 MB pixel positions in a MB row, and then produces 8 SADs for all 4 pixels at 8 quarter-pel positions. Each SAD is accumulated in a 16-bit register/accumulator to form a SAD for a 4×4 block of pixels in 4 passes of the inner execution loop.

Figure 6:
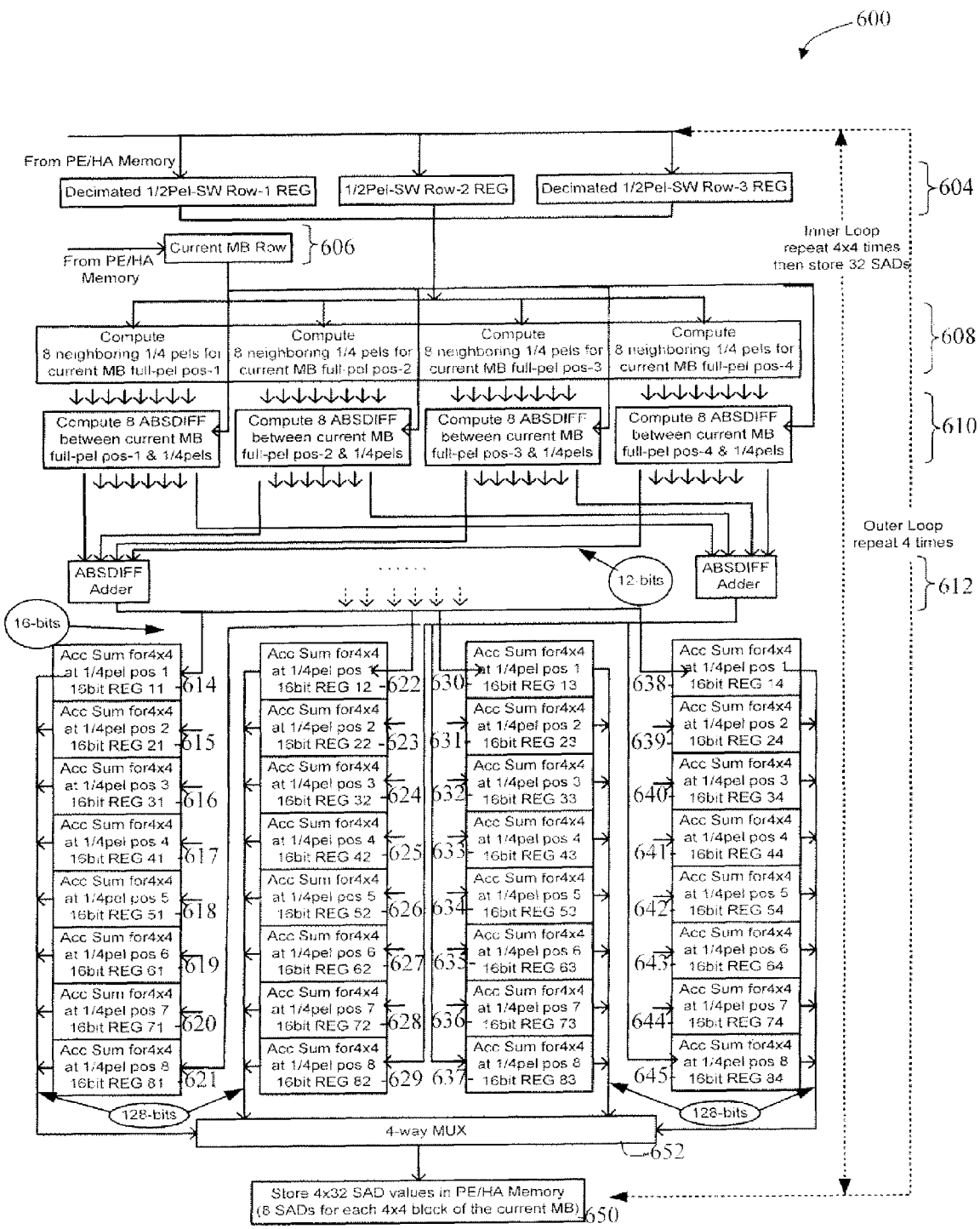
FIG. 6 illustrates the quarter-pel motion compensated search hardware assist pipeline in further detail including the first portion of the pipeline illustrated in FIG. 5 in accordance with the present invention.

FIG. 6 illustrates the quarter-pel motion compensated search hardware assist pipeline 600 in further detail including the first portion of the pipeline illustrated in FIG. 5 in accordance with the present invention. It contains 4 groups of 8 16 bit registers/accumulators, allowing for each group to form 8 SAD results for a 4×4 block of pixels at 8 quarter-pel displacements. The execution for a 16×16 MB is staged in 4×4 inner loops, computing 4×8 SADs for four horizontally aligned 4×4 blocks of the current MB. The outer loop repeats 4 times, once for each row of 4×4 blocks. Each quarter-pel residue is also extracted and stored in the local PE/HA memory such as PE8 and hardware assist data memory 138. The starting position of the search window is determined based on the best matching result previously calculated for full pel and half-pel current MB displacement.

The quarter-pel motion compensated search (QPMS) operation is initiated by use of a QPMS instruction as discussed above.

The pipeline executes the following steps:
1. Load three quarter-pel search window rows into 3 internal HA registers 604;
2. Load current MB row into a dedicated internal HA register 606;
3. Simultaneously compute eight neighboring quarter-pels for four horizontal pixel positions of the current MB 608;
4. For each of the four contiguous horizontal current MB pixels compute in parallel 8 absolute differences (ABSDIFF) between the current MB pixel and 8 corresponding quarter pixels. Extract and store in the local PE/HA memory computed quarter-pel residues for each current MB pel 610;

5. Simultaneously form 8 ABSDIFF sums for each quarter pixel position 1 through 8, and four current MB pixels 612;
6. Accumulate 8 ABSDIFF sums in the set of eight 16-bit accumulator-registers (REG 11 614, 21 615, 31 616, 41 617, 51 618, 61 619, 71 620, and 81 621);
7. Load the next four (shift right) pixels from the three SW registers into the pipeline;
8. Repeat steps 3, 4, 5;
9. Accumulate 8 ABSDIFF sums in the set of eight 16-bit accumulator-registers (REG 12 622, 22 623, 32 624, 42 625, 52 626, 62 627, 72 628, and 82 629);
10. Load the next four (shift right) pixels from the three SW registers into the pipeline;
11. Repeat steps 3, 4, 5;
12. Accumulate 8 ABSDIFF sums in the set of eight 16-bit accumulator-registers (REG 13 630, 23 631, 33 632, 43 633, 53 634, 63 635, 73 636, and 83 637);
13. Load the next four (shift right) pixels from the three SW registers into the pipeline;
14. Repeat steps 3, 4, 5;
15. Accumulate 8 ABSDIFF sums in the set of eight 16-bit accumulator-registers (REG 14 638, 24 639, 34 640, 44 641, 54 642, 64 643, 74 644, and 84 645);
16. Load the next two rows of the search window. Load the next MB row;
17. Repeat steps 3 through 15 three more times;
18. Store 32 SAD values for the four 4×4 blocks of the current MB in the PE/HA memory 650;
19. Repeal steps 3 through 18 three more limes using the 4-way mux 652 to select the appropriate values.

A total of 128 SAD values are produced and stored in the PE/HA local memory for further processing by the PE. Arithmetic compute flags (ACFs) may be set at the end of the quarter-pel motion compensated search operation and passed to the DSU to register the flags.

While the present invention has been disclosed in the context of various specific illustrative embodiments, it will be recognized that the invention may be suitably applied to other environments and applications consistent with the claims which follow.

We claim:

1. A method for quarter-pel motion compensated search comprising:
    issuing an instruction to a processing element (PE) configured to cause a command and parameters be passed to a hardware assist unit (HAU) configured to initiate a quarter-pel motion compensated search (QPMCS) operation pipelined on the HAU;
    interpolating a 4×4 block of current macro block pel position values in response to the command to produce at least eight neighboring quarter-pels per a first HAU pipeline stage;
    computing at least eight absolute value of difference (ABSDIFF) values between a current macro block pel and the at least eight neighboring quarter-pels per a second HAU pipeline stage while the first HAU pipeline stage is interpolating a next set of pel position values; and
    accumulating at least eight summation of ABSDIFF values for the 4×4 block at quarter-pel positions per a third HAU pipeline stage while the second HAU pipeline stage is computing a next set of at least eight ABSDIFF values, wherein results of accumulating are stored in a memory coupled to the HAU and separately coupled to the PE, wherein the issuing of the instruction includes broadcasting the instruction to at least two separate PEs to initiate the quarter-pel motion compensated search operation on two HAUs, wherein each HAU is separately coupled to a different PE of the at least two separate PEs.

2. The method of claim 1, wherein the instruction is a load instruction configured for passing commands and address generation values to the HAU.

3. The method of claim 1, wherein the interpolating comprises:
    interpolating in parallel four pel position values per row of the 4×4 block of current macro block pel position values to produce eight quarter-pel values for each pel position value in the row.

4. The method of claim 3, wherein the computing comprises:
    computing in parallel ABSDIFF values for the four pel position values per row of the 4×4 block to produce 4×8 ABSDIFF values.

5. The method of claim 4, wherein the accumulating comprises:
    summing eight ABSDIFF values for the four pel position values per row at eight quarter pel positions to produce eight sum of absolute difference (SAD) values; and
    accumulating the at least eight summation of ABSDIFF values.

6. The method of claim 1, further comprising:
    repeating the interpolating, computing, and accumulating operations four times, once for each row of the 4×4 block of current macro block pel position values to produce accumulated sum of absolute difference (SAD) results; and
    storing the accumulated SAD results in the memory to be separately accessed by the PE for processing.

7. An apparatus for quarter-pel motion compensated search comprising:
    an instruction decode and instruction operation control unit in a hardware assist unit (HAU) configured to receive a command and parameters from a processing element (PE) to generate a starting address for a 4×4 block of pel values of a current macro block search operation indicating where to fetch the pel values in a memory coupled to the HAU;
    an interpolation unit configured for determining at least eight neighboring quarter-pels per a first HAU pipeline stage based on the 4×4 block of pel values;
    an absolute value of difference function configured to compute absolute value of difference (ABSDIFF) values between a current macro block pel and the at least eight neighboring quarter-pels per a second HAU pipeline stage while the first HAU pipeline stage is interpolating a next set of pel position values;
    an accumulator configured for accumulating at least eight summation of ABSDIFF values for the 4×4 block at quarter-pel positions per a third HAU pipeline stage while the second HAU pipeline stage is computing a next set of at least eight ABSDIFF values, wherein results of accumulating are stored in the memory coupled to the HAU;
    at least a first HAU and a second HAU each comprising an apparatus for quarter-pel motion compensated search, wherein the first HAU is coupled to a first PE and separately coupled to a first memory, the second HAU is coupled to a second PE and separately coupled to a second memory, the first PE is separately coupled to the first memory, and the second PE is separately coupled to the second memory; and an instruction issuing unit configured to issue an instruction to the two different PEs to initiate the quarter-pel motion compensated search in the first HAU and in the second HAU.

8. The apparatus of claim 7 further comprising:
a current macro block row register for storing four pel position values of the 4×4 block of pel values;
a first half pel row register of decimated half pel position values;
a second half pel row register of decimated half pel position values; and
a third half pel row register of decimated half pel position values.

9. The apparatus of claim 8, wherein the interpolation unit determines the at least eight neighboring quarter-pels for each of the four pel position values stored in the current macro block row register by averaging a current macro block pel position value and half pel position values in vertical, horizontal, and diagonal directions obtained from the first half pel row register, the second half pel row register, and the third half pel row register.

10. The apparatus of claim 7, wherein the instruction decode and instruction operation control unit comprises:
a multi-cycle state machine which is initiated in response to the command and parameters to provide a hardware assist for quarter pel motion search refinement.

11. The apparatus of claim 7 further comprising:
a load unit interface to the memory for fetching the 4×4 block of pel values; and
a store interface to the memory for storing the results of accumulating in the memory.

12. An apparatus comprising:
a first memory unit and a second memory unit;
a first processing element (PE) coupled to the first memory unit and a second PE coupled to the second memory unit, each PE coupled to a controller;
a first hardware assist unit (HAU) separately coupled to the first memory unit and to the first PE and a second HAU separately coupled to the second memory unit and to the second PE, wherein each PE is configured to receive an instruction dispatched from the controller which causes the first PE to initiate a first quarter pel motion compensated search operation on the first HAU and causes the second PE to initiate a second quarter pel motion compensated search operation on the second HAU in parallel with the first quarter pel motion compensated search operation;
a first instruction decode and control unit in the first HAU configured to initiate the first quarter pel motion compensated search operation associated with a loaded first 4×4 block of pel values in response to commands and address values passed from the first PE;
a second instruction decode and control unit in the second HAU configured to initiate the second quarter pel motion compensated search operation associated with a loaded second 4×4 block of pel values in response to commands and address values passed from the second PE;
an interpolation unit configured for determining at least eight quarter pel values for each pixel in a row of a 4×4 current macro block, wherein one quarter pel value is determined for each position of eight quarter pel positions;
an absolute value of difference (ABSDIFF) function configured to compute ABSDIFF values between the at least eight quarter pel values and each pixel in the row of the 4×4 current macro block; and
an accumulator configured for accumulating a plurality of summation of ABSDIFF values for each pixel in the row of the 4×4 current macro block at each of the eight quarter pel positions.

13. The apparatus of claim 12, wherein the controller comprises:
an instruction address generation unit for fetching instructions and dispatching fetched instructions to the first PE and to the second PE, wherein the fetched instructions provide a single thread of control which operates the first PE and the second PE in a single instruction multiple data (SIMD) fashion.

14. The apparatus of claim 12, wherein the first PE and the second PE each comprises:
an instruction interface to receive and decode the dispatched instruction;
a register file for transfer of data with the coupled HAU; and
a load unit for passing commands and address values to the coupled HAU in response to the dispatched instruction.

15. The apparatus of claim 12 further comprising:
a first multi-cycle state machine in the first HAU configured to operate and control a first quarter pel motion compensated search hardware assist pipeline; and
a second multi-cycle state machine in the second HAU configured to operate and control a second quarter pel motion compensated search hardware assist pipeline.

16. The apparatus of claim 15, wherein the first quarter pel motion compensated search hardware assist pipeline comprises a first interpolator, a first absolute value of difference (ABSDIFF) function, and a first accumulator and wherein the second quarter pel motion compensated search hardware assist pipeline comprises a second interpolator, a second ABSDIFF function, and a second accumulator.

* * * * *